Figure 1:
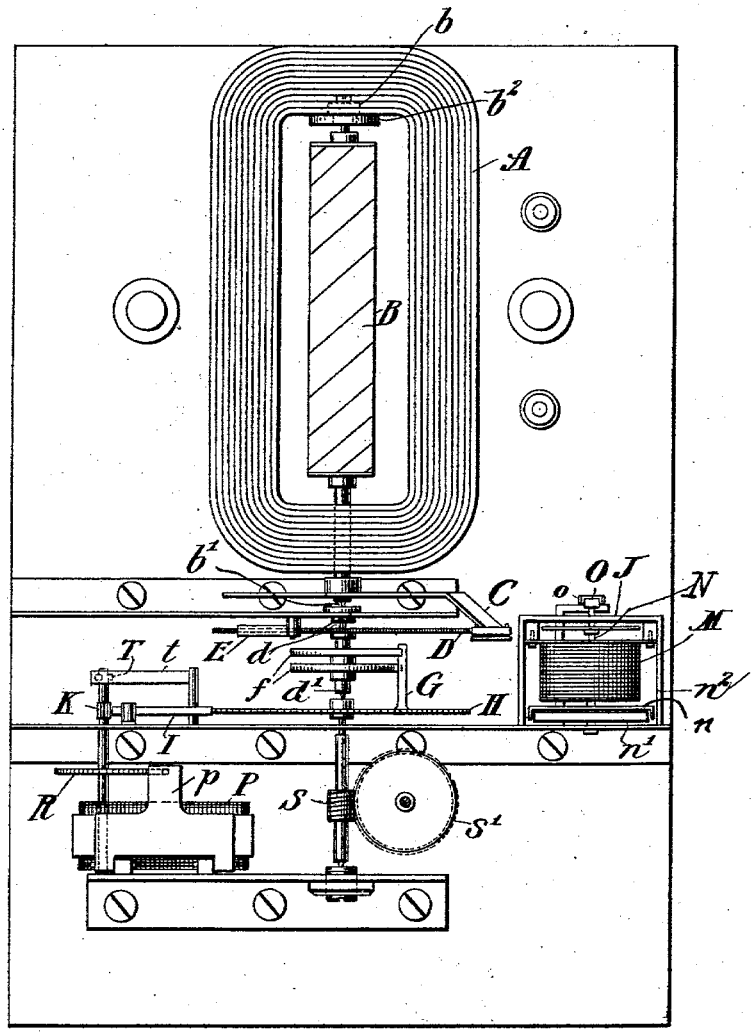

No. 720,980. PATENTED FEB. 17, 1903.
W. STANLEY.
METER.
APPLICATION FILED JUNE 25, 1902.
NO MODEL. 2 SHEETS—SHEET 1.

Witnesses Inventor,
William Stanley,
By his Attorney

No. 720,980. PATENTED FEB. 17, 1903.
W. STANLEY.
METER.
APPLICATION FILED JUNE 25, 1902.
NO MODEL. 2 SHEETS—SHEET 2.

UNITED STATES PATENT OFFICE.

WILLIAM STANLEY, OF GREAT BARRINGTON, MASSACHUSETTS, ASSIGNOR TO STANLEY INSTRUMENT COMPANY, OF GREAT BARRINGTON, MASSACHUSETTS, A CORPORATION OF MASSACHUSETTS.

METER.

SPECIFICATION forming part of Letters Patent No. 720,980, dated February 17, 1903.

Application filed June 25, 1902. Serial No. 113,084. (No model.)

*To all whom it may concern:*

Be it known that I, WILLIAM STANLEY, a citizen of the United States, residing at Great Barrington, Massachusetts, have invented certain new and useful Improvements in Meters, of which the following is a full, clear, and exact description.

My improvement relates to meters, and has for its object to produce a simple and effective meter which shall be easy to manufacture and accurate in operation and fill a demand now existing for an inexpensive and efficient apparatus.

My invention particularly relates to that type of electrical measuring instruments in which a movable coil carrying a current is dynamically acted upon by the field of a near-by stationary coil, known in the art as an "electrodynamometer." In such instruments, as is well known, there is produced a torque of the movable coil exactly proportional to the electrical energy transmitted, and they are employed in the art to indicate by the deflection of a suitable pointer the value of the energy transmitted in the circuit to which they are connected, but are incapable of integrating the sum of such energy over any given time. In devices embodying my invention the dynamometer is used in connection with other devices, so that it shall automatically integrate the torque developed upon it, and consequently indicate by suitable registering devices the sum of the energy that has passed, expressing such sums in units of time.

The principal elements of the apparatus embodying my invention consist of, first, a time-beater or a device for accurately producing a given value of motion or given rotation of a wheel, for example, in a given time; second, an electrodynamometer or device for accurately expressing by its torque the value of energy transmitted through it from instant to instant; third, an integrating system or arrangement for accurately recording the sum of the torque values developed by the dynamometer in terms of time. Thus, for example, the torque developed during a given period may have a value expressed by the length of a spring required to balance it and may therefore be expressed in inches. The number of such inches per hour would therefore represent the value of the energy transmitted per hour, and the term "inch-hours" would be equivalent to "watt-hours" multiplied by a constant.

My invention is embodied in a wattmeter, that being the kind of meter which is particularly desired; and it consists of a device for indicating equal periods of time and means for indicating the energy consumed during these intervals and means for integrating these indications.

My invention is embodied in the apparatus shown in the accompanying drawings, in which—

Figure 2:
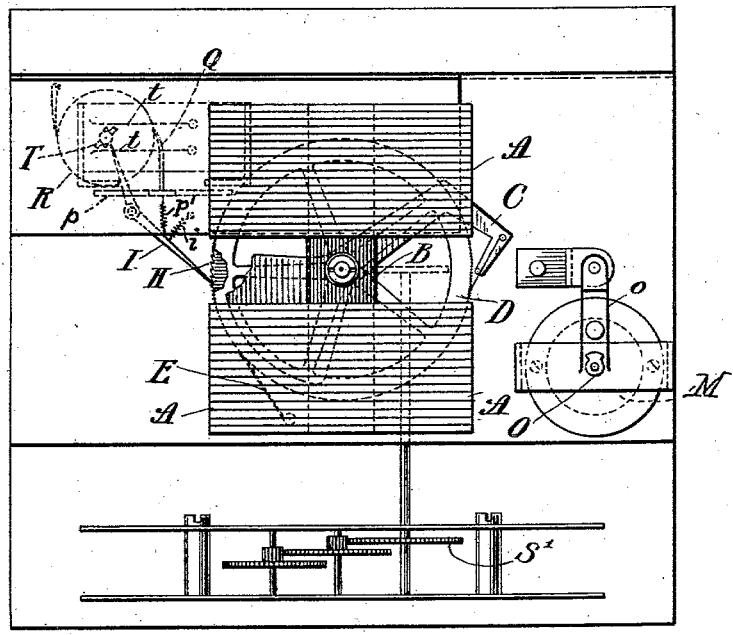
Figure 3:
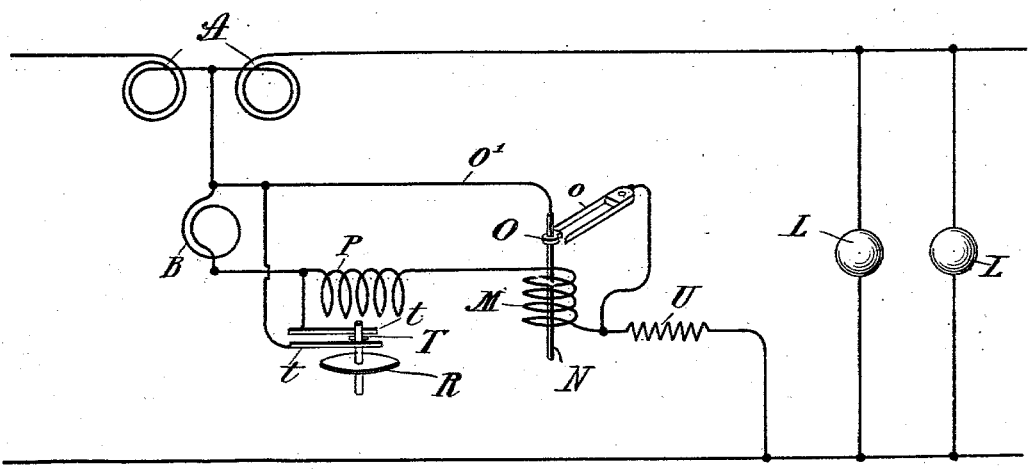

Figure 1 represents a front elevation of the meter. Fig. 2 is a plan view. Fig. 3 shows the circuits.

Referring more particularly to the drawings, A is a series coil.

B is a shunt or pressure coil in parallel with the lamps L or other devices to which the current to be measured is supplied. This coil B is mounted in bearings $b\ b'$, so as to swing slightly within the coil A, tending toward the zero position by reason of the spring $b^2$. To the lower end of the coil B is attached a pawl C, which engages with ratchet-teeth on the wheel D, which is on a shaft journaled at $d\ d'$. It is held from rotating in one direction by a pawl E. As the coil A swings back and forth the pawl C rotates the wheel D against the action of the coiled springs $f$, whose inner ends are attached to the shaft of the wheel D and whose outer ends are attached to a post G, mounted upon the wheel H. This wheel H has ratchet-teeth with which the pawl I, acted upon by the spring $i$, engages and holds it from rotation, except when it is periodically released. This periodic release is brought about by the time-beater J and the magnetically-operated trip K, actuated thereby. The time-beater consists of a coil M, through which passes an iron shaft N, pivoted so as to swing freely.

$n$ is a bar of iron carried thereby, and $n'$ is a spring attached thereto and normally holding the bar $n$ slightly out of alinement with the iron frame $n^2$. To the top of the shaft N is attached a cam O, which, except when in the position shown in Fig. 2, makes contact with the spring o. As the shaft swings the cam O makes and breaks contact with the spring o, in the former instance shunting the current around the coil M and deënergizing it. When contact is broken, the coil M is energized, magnetizing the armature n and giving it an impulse which keeps it and the shaft and cam connected therewith swinging with a regular beat. Whenever the cam O and spring o make contact, the magnet P, which is in series with the coil M, is also short-circuited and deënergized. The making and breaking of the circuit O' by the cam O and spring o keeps the armature p of the magnet P oscillating, the spring p' acting to retract it. This armature carries a pawl Q, which engages with the toothed wheel R and causes it to rotate with the trip K, which twice during each revolution trips the pawl I and causes it to release the wheel H, which then swings around under the action of the springs f, causing the worm S carried thereby to operate the integrating-train S'. At the same time that the trip K releases the pawl I the bar T makes contact with the two spring-terminals t t, which short-circuits the coil B.

U is a resistance in the shunt-circuit.

When in operation, the time-beater J by opening and closing the circuit O' maintains its own oscillation and by energizing and deergizing the magnet P keeps its armature p vibrating. It also keeps the coil B periodically energized and deënergized, except when that coil is short-circuited by the bar T and springs t t. Whenever the lamps L L are in use, current flows through the coil A. As soon as this takes place the current in the coil B causes it to move or attempt to move the wheel D against the action of the springs f. The energizing and deënergizing of the coil B causes it to rotate the wheel D step by step until the torque due to the currents in the coils A B is not sufficient to cause further movement against the springs f. The wheel D is retained in its position by the pawl E, and when the pawl I releases the wheel H that wheel revolves under the action of the springs f, transmitting to the integrating-train S' an indication of the energy consumed during the period, consisting of one-half revolution of the wheel R. During the time that the wheel H is revolving the coil B is deënergized, so as not to act upon the wheel D, this being brought about by the bar T making electric contact with the terminals t t.

Since the coils A and B are respectively series and shunt coils, it will be seen that the torque corresponding to the watts of the current passing to the devices L is indicated at frequent intervals by the movement of the wheel D and that the movements of this wheel are periodically transmitted to the integrating-train S', resulting in an indication of the watt-hours or energy consumed in the translating devices L. The apparatus while simple is remarkably effective and accurate and can be used to measure both alternating and continuous currents.

The method described above is claimed in my copending application, Serial No. 115,815, filed July 16, 1902.

What I claim is—

1. In a meter, the combination of series coils and shunt-coils, a time-beater, means actuated thereby to energize and deënergize said shunt-coil, means to periodically integrate the indications of said shunt-coil and means for short-circuiting said coil while such integration is taking place.

2. In a meter, the combination of an oscillating shunt-coil, an oscillating armature, a spring-actuated wheel acted upon by said shunt-coil, a pawl in engagement therewith, means actuated by said armature for periodically releasing said pawl, and means for short-circuiting said shunt-coil during the time said pawl is released.

3. In a meter, the combination of a series coil and a shunt-coil, a time-beater, means actuated thereby to energize and deënergize said shunt-coil, means to integrate the indications of said shunt-coil, and a magnet having a vibrating armature acting to periodically check said shunt-coil and permit said train to integrate.

4. In a meter having indicating and integrating periods, the combination of a series coil and a relatively movable shunt-coil, a time-beater, means actuated thereby to energize and deënergize said shunt-coil, means to integrate the indications of said shunt-coil, and a magnet having a vibrating armature acting to check said shunt-coil and release said integrating mechanism during integration periods and to check said integrating mechanism and permit said shunt-coil to act during the indicating periods.

5. In a meter, the combination of a dynamometer having a movable shunt-coil, a time-beater, means actuated thereby to energize and deënergize said shunt-coil, and a magnet having a vibrating armature acting to periodically short-circuit said shunt-coil and to permit said train to integrate, and also periodically opening said shunt and checking said train.

Signed at Great Barrington, Massachusetts, this 21st day of June, 1902.

WILLIAM STANLEY.

Witnesses:
WM. H. BROWNE,
F. V. T. LEE.